W. GRIESSER.
ATTACHMENT FOR STORAGE AND REFRIGERATING TANKS.
APPLICATION FILED MAR. 21, 1908.
948,219.
Patented Feb. 1, 1910.
2 SHEETS—SHEET 2.
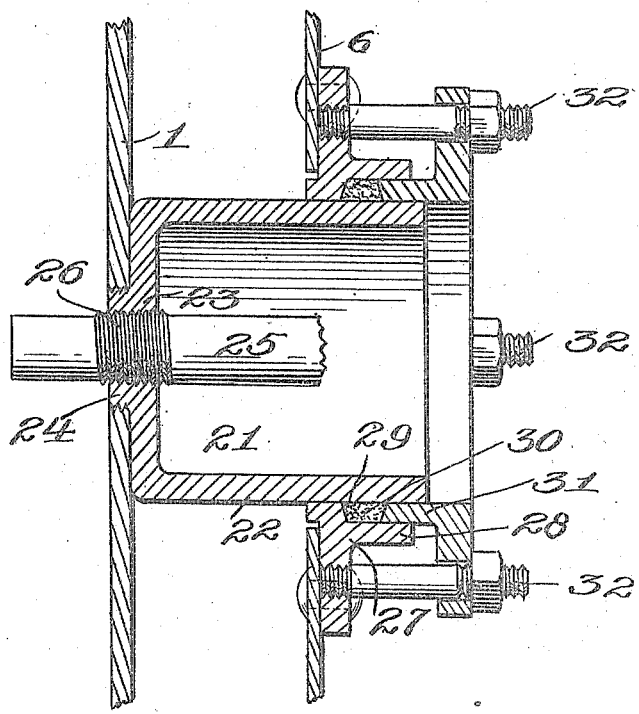
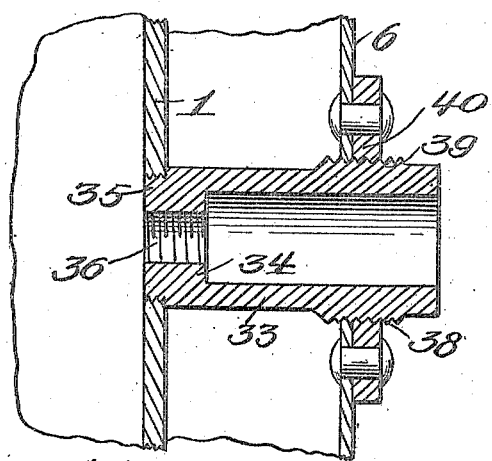
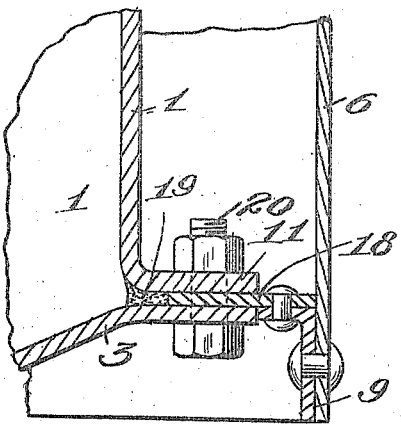
Witnesses:
Inventor
Wilhelm Griesser
By James L. Norris
Atty.

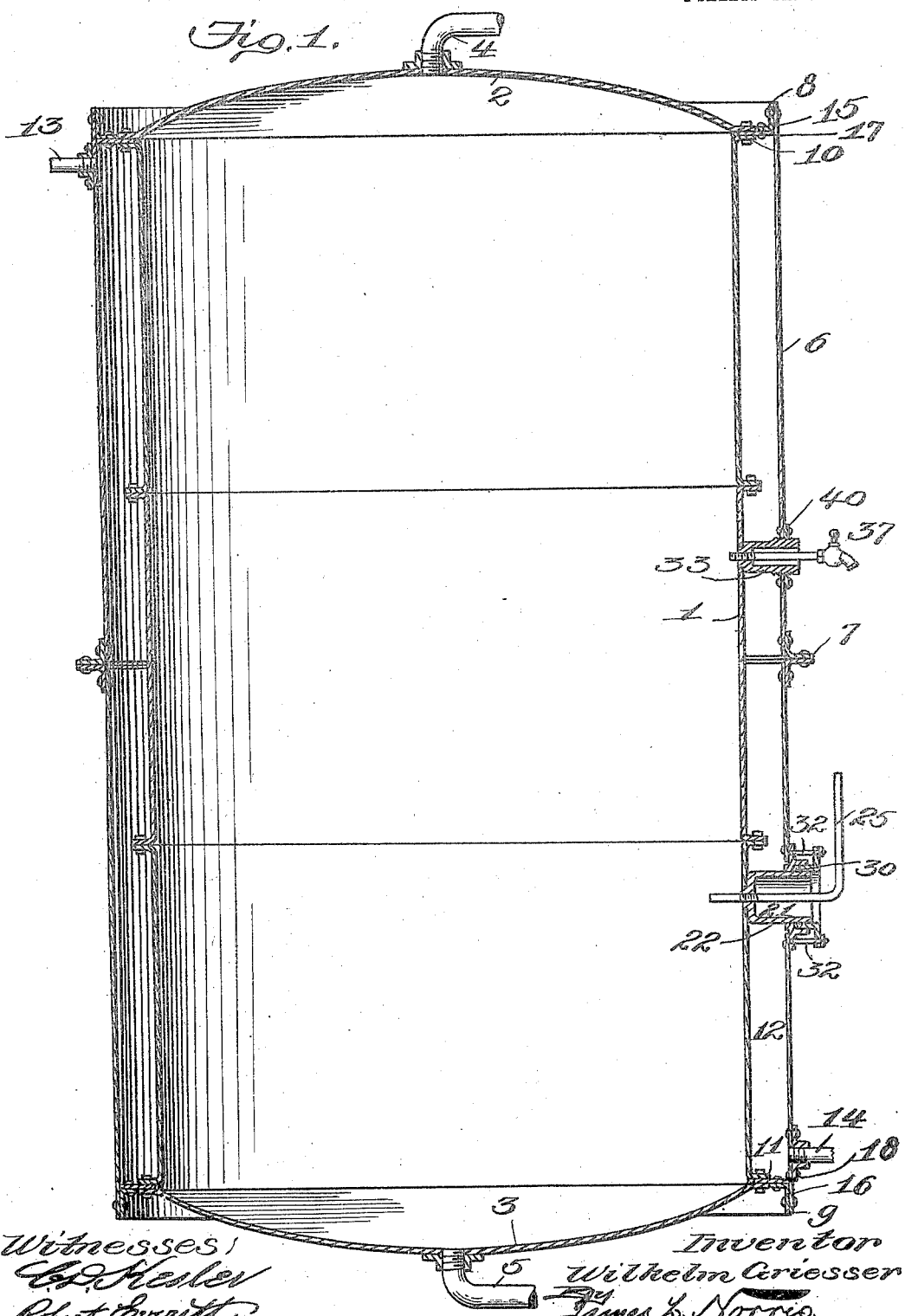

UNITED STATES PATENT OFFICE.

WILHELM GRIESSER, OF PITTSBURG, PENNSYLVANIA.

ATTACHMENT FOR STORAGE AND REFRIGERATING TANKS.

948,219.  Specification of Letters Patent.  Patented Feb. 1, 1910.

Application filed March 21, 1908. Serial No. 422,457.

*To all whom it may concern:*

Be it known that I, WILHELM GRIESSER, a citizen of the United States, residing at Pittsburg, in the county of Allegheny and State of Pennsylvania, have invented new and useful Improvements in Attachments for Storage and Refrigerating Tanks, of which the following is a specification.

My present invention relates to improvements in attachments for tanks, especially of the class adapted for use in the storage and refrigeration of liquids, such as those used in the manufacture of beer, tanks of the class to which the present invention is applied being composed of inner and outer shells, the inner shell being adapted to contain the liquid and a space being provided between the two shells for the circulation of a cooling medium, and the object of the present invention is to provide novel means for fitting thermometers, test cocks and similar devices to the tanks, these fittings being so applied as to connect the thermometer, test cock or other device with the liquid contained in the inner shell or tank, and that portion of the thermometer or other device which extends through the space between the tanks is incased so as to protect it from the influence of the refrigerating or other medium which fills the said space, the protection thus afforded insuring a correct reading of the thermometer, whereby the temperature of the liquid within the inner tank may be accurately ascertained, and when the improved fittings are applied to test cock and similar connections, the liability of freezing thereof by reason of the influence of the refrigerating liquid or medium between the shells is avoided.

A further object of the invention is to improve the general construction of the tank and the manner of mounting the inner or liquid containing shell within the outer shell which surrounds and provides a jacket therefor.

To these and other ends, the invention consists in certain improvements, and combinations and arrangements of parts, all as will be hereinafter more fully described, the novel features being pointed out particularly in the claims at the end of the specification.

In the accompanying drawing: Figure 1 represents a central vertical section of a storage or refrigerating tank constructed in accordance with my invention and equipped with improved fittings for a thermometer and test cock; Fig. 2 represents an enlarged sectional view of the thermometer fitting; Fig. 3 is an enlarged sectional view of a test cock fitting; and Fig. 4 is a detail sectional view illustrating the manner of mounting the inner shell within the outer shell and for packing the joint between the inner shell and its head.

Similar parts are designated by the same reference characters in the several views.

It will be understood, of course, that thermometer, test cock and other fittings constructed in accordance with my present invention are capable of use generally in connection with jacketed tanks of various kinds, the invention being shown in the present instance as applied to a storage or refrigerating tank of the character adapted for use in the manufacture of beer.

The tank shown in the present instance is composed of an inner shell 1 of steel or other material, the shell being generally of cylindrical form, and by reason of its size, it is generally made up of a plurality of superposed annular sections which are joined by coöperating external flanges, the latter being usually riveted or bolted together as shown. The upper and lower ends of the inner shell are closed by the heads 2 and 3 which are riveted or bolted to the respective flanges of the uppermost and lowermost annular sections. The upper head is provided with an inlet 4 by means of which the liquid may be introduced into the inner shell, and the lower head 3 is provided with an outlet 5 by means of which the said liquid may be withdrawn or discharged from the liquid tank. This liquid containing tank is surrounded by an outer shell or jacket 6 which may be composed of steel or other appropriate material, and to facilitate the manufacture and assembling thereof, this outer shell or jacket may also be composed of a suitable number of superposed annular sections having coöperating flanges 7 which are bolted, riveted or otherwise secured together. The outer jacket is preferably of a length slightly greater than the length of the liquid tank or inner shell so that its upper and lower edges 8 and 9 project slightly beyond the flanges 10 and 11 of the upper and lower sections thereof. The inner shell or tank is supported within the outer shell or jacket in such a manner as to form a closed circulating chamber 12 to receive a non-congealable refrigerating liquid or medium from an ice-making machine, this liquid being introduced into the space between the shells through an inlet 13 and is returned through an outlet 14, the inlet and outlet pipes being attached to the outer shell by threading them into suitable flanges as shown. Surrounding the interior of the outer shell immediately adjacent its upper and lower ends are a pair of rings 15 and 16, these rings being of angle iron form in cross section and thus providing annular internal flanges which are arranged in planes perpendicular to the axis of the tank. The rings are riveted or otherwise secured within the outer shell and have riveted or otherwise secured thereto annular supporting plates 17 and 18, these supporting plates projecting inwardly a distance sufficient to enter between the flanges 10 and 11 of the inner shell or tank and the heads 2 and 3 which are bolted or otherwise secured thereto, the plates 17 and 18 thus serving not only to close the circulating space 12 at the upper and lower ends of the tank, but also to support the inner shell or tank within the outer shell or jacket. The inner circumference of the supporting plates 17 and 18 does not extend quite to the interior of the inner shell or tank 1, and the space between the inner circumference of each of the supporting plates and the interior of the tank 1 is filled by a packing ring 19 which is firmly clamped between the adjacent flange 11 and the coöperating flange on the head 3 by means of the bolts 20, the packing material serving to provide a liquid-tight joint to prevent the escape of liquid from the inner tank or the entrance into the latter of the refrigerating liquid from the space between this inner tank and the outer shell or jacket.

In the manufacture of beer and in the handling of many other liquids, it is essential in order to secure the best results, that the temperature of the liquid within the tank should be accurately ascertainable, and for this reason, I have devised a novel fitting for a thermometer, the latter being subject only to the influence of the liquid contained in the inner tank, being protected from the influence of the refrigerating or other medium contained in the space between the tank and the outer shell or jacket. This fitting in the present instance comprises a casing 21, it being shown in the present instance as substantially cup-shaped. This casing has a cylindrical circumference 22 in the form of a sleeve, and one end of the casing is closed by the end wall 23. The latter is adapted to abut against the wall of the tank or inner shell 1 and is provided with a threaded nipple or stem 24 which has a liquid-tight fitting into the wall of the shell 1. The thermometer 25 extends through the end wall 23 of the casing and projects into the liquid contained in the tank or inner shell, the thermometer being suitably fitted into the end wall of the casing so as to prevent leakage of liquid from the tank or inner shell. In the present instance, the thermometer is shown as provided with threads 26 which coöperate with a correspondingly threaded bore formed in the end wall of the casing, and the thermometer is so much smaller in diameter than that of the casing as to provide a considerable space between it and the walls of the casing, thereby preventing the conduction of heat between the thermometer and casing. The outer end of the shell 21 is preferably open so as to permit air at atmospheric temperature to enter it and thus prevent undue cooling of the walls of the casing under the influence of the refrigerating fluid surrounding it. The casing must have a liquid-tight connection with the outer shell or jacket 6, and in some instances, it is preferable to provide a compensating connection whereby relative expansion and contraction between the shells may occur without straining the fittings. In the present instance, a stuffing box connection is provided between the casing 21 and the outer shell, the latter being provided with an annular flange or box 27 which is riveted or otherwise secured to the shell 6 and is provided with an outwardly projecting ring 28 which forms an annular recess 29 adapted to contain a ring of packing material 30, and this packing material is compressed and held in coöperative relation with the smooth exterior or circumference of the casing by means of a gland 31 which is drawn into position by means of a suitable number of bolts 32 which connect the gland to the flange 27. This stuffing box connection while it forms a liquid-tight joint so as to prevent leakage of the refrigerating medium from the space between the shells, serves at the same time to provide a compensating connection for the fitting, permitting relative expansion and contraction of the two shells without straining.

A fitting such as shown in Fig. 3 may be used for attaching test cocks and other connections to the inner shell or tank, this fitting being composed of a casing 33 having its inner end closed by an end wall 34, the latter having a threaded nipple or stem 35 which engages a threaded opening formed in the inner shell or tank 1, and this nipple may be threaded as at 36 or otherwise adapted to receive the connection for the test cock 37 as shown in Fig. 1. The casing 33 is connected to the outer shell or jacket by means of threads 38 which are formed on an annular shoulder 39 and extend helically of the axis of the casing. These threads may be of the same pitch as those on the nipple or stem 35 and are co-axial therewith, the threads 38 coöperating with an interiorly threaded flange 40 riveted or otherwise secured to the outer shell or jacket 6. In case the thickness of the jacket is sufficient, it will be unnecessary to use a threaded flange to receive the threads 38, the threads in that instance being formed directly in the shell. The threads on the nipple 35, however, are preferably of a diameter less than the external diameter of the casing 33 so that the inner end of the casing abuts against the exterior of the shell 1.

Attachments for storage or refrigerating tanks constructed in accordance with my present invention may be used with excellent results in the processes of manufacturing beer and of handling liquids of various kinds, the improved fittings for the thermometer, test cocks and similar connections enabling the precise temperature of the liquid within the tank to be ascertained at any time, and when the tanks are used for refrigerating purposes, there is no delay or other annoyance occasioned by reason of the freezing of the connections, these parts being effectively protected from the influence of the refrigerating liquid or medium which fills the space formed between the tank and shell, and in using a compensating connection, such as that described, the relative expansion and construction of the walls of the vessels due to the filling and discharging of the liquid, may take place without subjecting any of the parts of the tank or the fittings to strain.

I claim as my invention:—

1. The combination with a vessel comprising inner and outer shells spaced to form a fluid circulating passage between them, of a fitting comprising a casing having its inner end rigidly connected to the inner shell and movable freely with respect to the outer shell, said fitting being provided with means for attaching a testing device thereto at its inner end.

2. The combination with a vessel comprising a tank and an outer shell forming a surrounding jacket, of a fitting comprising a casing having its inner end fitted into the tank and having its outer portion extending adjustably through the outer shell or jacket and open to the atmosphere, and means for attaching a testing device to said casing at a point adjacent to its inner end only so as to extend to the interior of the tank.

3. The combination with a tank, and a surrounding shell forming a jacket, of a fitting comprising a cup-shaped casing having its inner end threaded into the wall of the tank and having a hollow outer portion extending through the space between the tank and jacket, the chamber within the cup-shaped casing opening at its outer end to the atmosphere and a testing device attached to the inner end only of the fitting.

4. The combination with a vessel comprising inner and outer shells spaced to form a fluid circulating passage, of a fitting comprising a casing rigidly attached to one of the shells and having a sliding fluid-tight connection with the other shell, and a testing device attached to the inner end of the fitting and spaced from the intermediate portion thereof.

5. The combination with a tank, and a surrounding shell forming a jacket, of a fitting composed of a cup-shaped casing having its inner end closed and attached to the tank, the outer end of the casing extending through the jacket and permanently exposed to the atmosphere, a stuffing box mounted on the outer shell or jacket and coöperating with said casing to provide a compensating fluid-tight connection therewith, and a testing device attached to the inner end of the fitting and spaced from the remainder thereof.

6. The combination of a tank, a surrounding shell forming a jacket to receive a heating or cooling medium, and a fitting comprising a casing having its inner end rigidly and tightly connected to the inner shell and having an enlarged body portion which extends through the jacket space formed between the tank and shell, the said body portion having a fluid-tight fit with the outer shell, the body portion being provided with an enlarged chamber which extends from the inner end of the casing to its outer end and is permanently exposed to the atmosphere, and a testing device secured to the inner end of the casing and having a portion extending through and thermally insulated from the walls of the body portion of the casing by said chamber, the latter being maintained at substantially atmospheric temperature.

7. The combination with a tank adapted to receive a liquid, and a surrounding outer shell spaced from the tank to form a circulating passage for a refrigerating liquid, of a thermometer fitting comprising a hollow casing extending through the space between the tank and shell, the inner end of the casing being substantially closed and provided with a nipple which is threaded into the tank, and the outer end of the casing being open permanently to the atmosphere, a stuffing box mounted on the outer shell and having a sliding fluid-tight fit with said casing, and a thermometer extending through and attached to the closed inner end and nipple on said casing and into the tank, a space being formed between the intermediate portion of said casing and the thermometer.

In testimony whereof I have hereunto set my hand in presence of two subscribing witnesses.

WILHELM GRIESSER.

Witnesses:
R. B. PETTY, Jr.,
E. M. YOST.